United States Patent [19]
Mony

[11] Patent Number: 6,009,383
[45] Date of Patent: Dec. 28, 1999

[54] DIGITAL CONNECTION FOR VOICE ACTIVATED SERVICES ON WIRELESS NETWORKS

[75] Inventor: Georges Mony, Montreal, Canada

[73] Assignee: Nortel Networks Corporation, Montreal, Canada

[21] Appl. No.: 08/961,141

[22] Filed: Oct. 30, 1997

[51] Int. Cl.[6] .................................................. G10L 3/00
[52] U.S. Cl. ......................................... 704/200; 455/418
[58] Field of Search .................................. 704/200, 201, 704/219, 231, 246, 270, 275; 455/418, 422, 421

[56] References Cited

U.S. PATENT DOCUMENTS

| | | | |
|---|---|---|---|
| 4,737,976 | 4/1988 | Borth et al. ................................ | 379/58 |
| 4,905,288 | 2/1990 | Gerson et al. ............................. | 381/43 |
| 5,335,276 | 8/1994 | Thompson et al. ........................ | 380/21 |
| 5,371,901 | 12/1994 | Reed et al. ................................ | 455/69 |
| 5,416,829 | 5/1995 | Umemoto .................................. | 379/58 |
| 5,430,724 | 7/1995 | Fall et al. .................................. | 370/79 |
| 5,491,719 | 2/1996 | Sellin ........................................ | 375/213 |
| 5,515,397 | 5/1996 | Wiorek ...................................... | 345/216 |
| 5,550,893 | 8/1996 | Heidari ...................................... | 379/59 |
| 5,592,556 | 1/1997 | Schwed ...................................... | 380/49 |
| 5,651,056 | 7/1997 | Eting et al. ................................ | 379/88 |
| 5,655,003 | 8/1997 | Erving et al. ............................. | 379/418 |
| 5,666,357 | 9/1997 | Jangi ......................................... | 370/345 |
| 5,703,881 | 12/1997 | Kay et al. ................................. | 370/468 |
| 5,721,827 | 2/1998 | Logan et al. .............................. | 395/200.47 |
| 5,737,703 | 4/1998 | Byrne ........................................ | 455/442 |
| 5,768,308 | 6/1998 | Pon et al. .................................. | 375/219 |
| 5,774,857 | 6/1998 | Newlin ...................................... | 704/271 |
| 5,774,859 | 6/1998 | Houser et al. ............................. | 704/275 |
| 5,809,066 | 9/1998 | Suomi et al. .............................. | 375/222 |

*Primary Examiner*—David R. Hudspeth
*Assistant Examiner*—Michael N. Opsasnick
*Attorney, Agent, or Firm*—Aprilia U. Diaconescu

[57] ABSTRACT

A voice service node (VSN) serving a wireless speech terminal (WST) connected to a mobile switching center (MSC) comprises a bypass unit, a speech codec and a speech recognizer. The bypass unit exchanges messages with a remote bypass unit at the MSC, and switches the operation of the VSN between a PCM mode, for analog speech terminals, and a codec bypass mode, for digital speech terminals. The speech codec operates during the bypass mode to decode a speech frame into a sequence of digital words for the speech recognizer and to encode a voice prompt signal form a speech prompting system from a sequence of digital words into a speech frame. The speech recognizer receives the sequence of digital words and a flag indicating the status of the frame and provides a set of parameters characterizing the sequence of digital words. The set of parameters and the flag are applied to a distance computation unit for determining a set of distances between a speech model and the set of parameters. A searching unit receives the set of distances and locates a plurality of choices in a lexicon. A top choice is determined, or all choices are rejected if none of them is above a recognition threshold.

17 Claims, 6 Drawing Sheets

20 ms
160 bytes

"C" = VSELP message 20 ms
160 bytes

"A" = DSPM identifier
"B" = DSPM Acknowledge

DIGITAL CONNECTION FOR VOICE ACTIVATED SERVICES ON WIRELESS NETWORKS

BACKGROUND OF THE INVENTION

1. Field of the Invention

The invention pertains to a method for providing enhanced performance for speech recognition services on digital wireless networks, and more particularly to a digital connection for voice activated services on wireless networks.

2. Background Art

A voice service node (VSN), is a platform which interacts with the telecommunication network to which it is attached through a switch, and provides one or more services such as banking information, user profiles, voice messages, call delivery, direct dialling, etc. under voice control, through speech recognition. The VSN guides the dialogue with the user through voice prompts, usually questions aimed at defining which information the user requires. An automatic speech recognizer is used to recognize what is being said and the information is used to control the behaviour of the service rendered to him/her.

Modem speech recognizers make use of phoneme based recognition, which relies on phone-based sub-word models to perform speaker independent recognition over the phone. In the recognition process, speech 'features' are computed for each incoming frame. Modern speech recognizers also have a feature called rejection. When rejection exists, the recognizer has the ability to indicate that what was uttered does not correspond to any of the words in the lexicon.

End-pointing is the process whereby the speech recognizer tries to determine exactly when a person begins and ends speaking. End points are also used to determine if the person did not actually say anything, or said something that is longer than expected, which will be likely out of the vocabulary.

The users of wireless communication services expect to have access to all services available to the users of the land communication systems, and to receive a similar quality of service. The voice activated services are particularly important to the wireless subscribers because the dial pad is generally away from sight when the subscriber listens to a vocal prompt, or is out of sight when driving a car. With speech recognition, there are virtually no restrictions on mobility, because callers do not have to take their eyes off the road to punch in the keys on the terminal.

Unlike land connections, the wireless connections used for mobile and fixed access communications are subject to a number of impairments, such as the time varying 'multi-path fading', shadowing, interference, etc., that result in channel errors. These errors degrade the quality of voice and services provided to the mobile users. For example, multi-path fading is a physical phenomenon due to lack of a direct line-of-sight communication between the antennae at the edges of the communication channel, such as the antenna at the cell site and the antenna of a mobile. Instead, the signal is reflected and diffracted by building surfaces and edges, or by natural objects such as hills, mountains, trees, so that the signal received on an antenna is the sum of multiple signals, each having followed its own path.

Most digital wireless systems encode and transmit speech in packets built from speech samples corresponding to a time slice called frame. For example, many systems collect and transmit speech information on 20 ms frames. Because of the wireless impairments mentioned above, the compressed information is sent with forward error control (FEC) protection and some mechanism (CRC) to detect at the receiver when a frame has been damaged to the point of being unusable or 'bad'. The current approach to correct the air link errors is a standard 'replication and muting' sequence effected by the speech decoder. When such a 'bad' frame is received, the speech decoder uses information from previous 'good' frames to regenerate speech; eventually the signal is muted.

As such, in the traditional wireless communication systems, pulse code modulated (PCM) samples coming out of the mobile telephone exchange (MTX) are sent to the VSN, feeding the speech recognizer with a signal that is attenuated and sometimes muted due to the RF impairments. Speech recognition errors occur as a result. In particular, the end-pointer that finds the beginning and end of each word is adversely affected by the muting intervals that can have the appearance of silence following speech, while actually occurring during utterances.

Furthermore, the recognizer does not have any indication about the frame boundaries or about which frames were muted/replicated or which are 'good'.

There is a need for enhancing the performance of the speech recognizer by providing the VSN with a means for minimizing the effects of air link errors.

SUMMARY OF THE INVENTION

It is an object of this invention to provide enhanced performance for speech recognition services on digital wireless networks.

It is another object of the invention to provide a speech recognizer with information on RF impairments of the received signal, so that it counteracts the replication and muting effects of the speech decoder.

It is still another object of the invention to provide a mechanism able to compensate for the drift in the replicated frames, by progressively downweighting the likelihood of replicated frames to reduce their importance in the HMM search. A frame that is muted is given a likelihood zero with regard to all speech models.

Still another object of the invention is to provide a rejection mechanism triggered partly by the appearance of replicated or muted frames in the received utterance. In its simplest form, the utterance is rejected when the number of consecutive replicated or muted frames exceeds a threshold.

Accordingly, voice service node (VSN) serving a wireless speech terminal (WST) connected to a mobile switching center (MSC), for voice recognition and voice prompting comprising a bypass unit for exchanging messages with a MSC bypass unit according to a bypass protocol and switching the operation of the VSN between a PCM mode of operation, when the WST is analog, and a codec bypass mode of operation when the WST is digital, a speech codec operating during the bypass mode for receiving an incoming voice signal in the form of speech frames and decoding a speech frame into a sequence of digital words, and a speech recognizer for receiving the sequence of digital words from the speech codec and recognizing an utterance corresponding to the sequence of digital words under the control of the bypass unit.

An advantage of the invention is that in a mobile to speech recognizer digital communication link, the speech frames are transmitted directly to the speech recognizer, before any conversion to a PCM format. In this way, the quality of the signals input to the speech recognizer is better than in conventional systems.

Another advantage is that the speech recognizer can be informed through in-band signalling what frames are replicated and muted so that it can treat these frames differently in counting metrics for speech recognition.

Still another advantage is that the system can determine from the number of frames replicated and muted that the recognition is too risky and prompt the user to repeat.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

Figure 1:
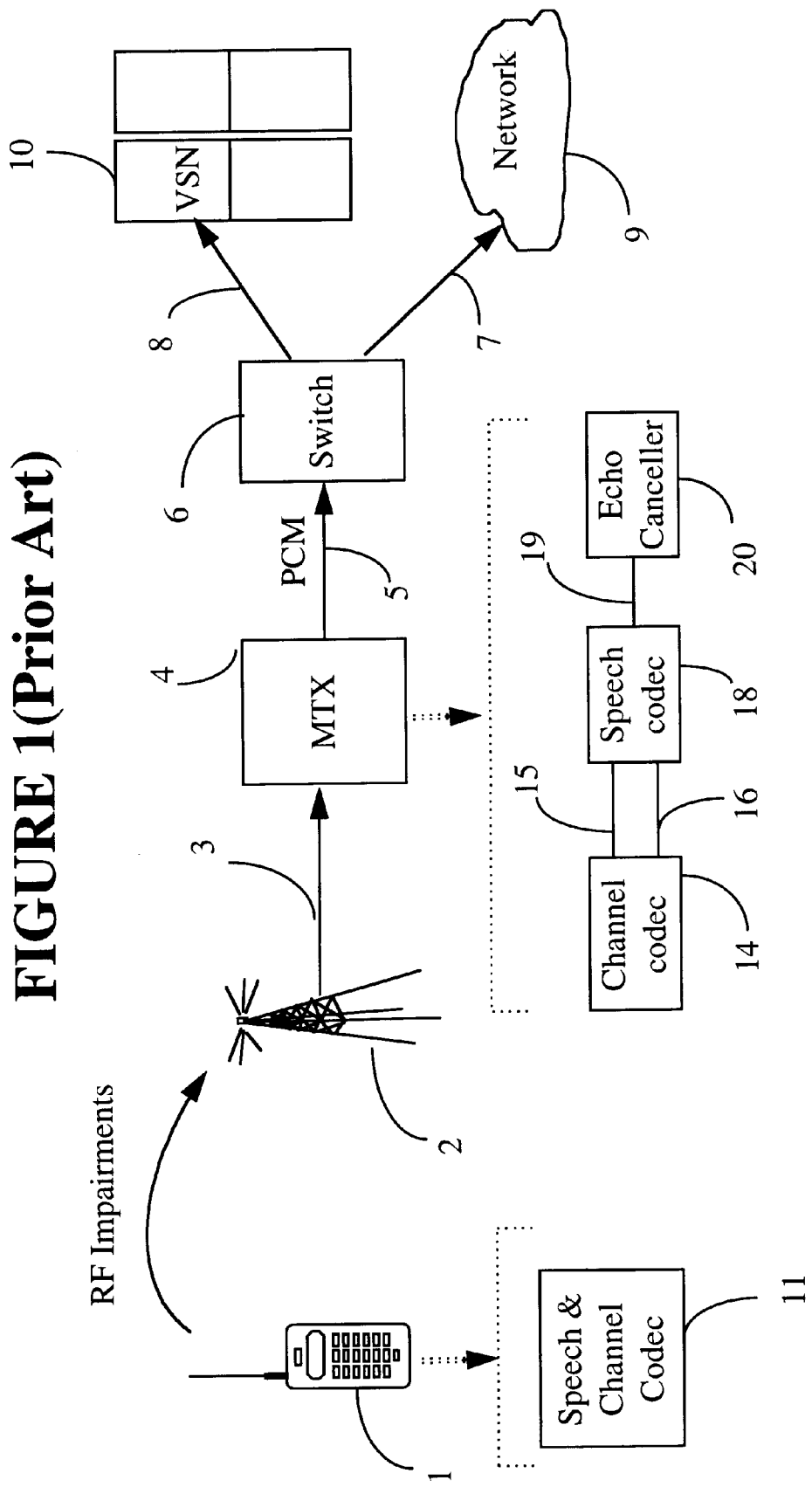
FIG. 1 shows a block diagram of the signal flow in a wireless network with a voice service node.

FIG. 1 illustrates a block diagram of the signal flow in a wireless network between a radiotelephone 1 and a voice service node (VSN) 10. The arrows in FIG. 1 show the flow of signals in the forward direction of communication, from the radiotelephone to the VSN. The processing of signals in the reverse direction is similar, but takes place in reverse order.

The speech signal generated by radiotelephone 1 is converted to a RF signal and broadcasted from radiotelephone antenna to base station 2. This is obtained by collecting the speech and converting it to, for example to a PCM (pulse code modulation) format, which is a succession of 8-bit words. It is to be understood that the invention is not limited to systems using PCM formatted signals, but a linear representation could also be used. The preferred embodiment is based on a North American TDMA system IS-54.

The PCM encoded speech is then filtered and compressed as a VSELP (vector sum excited linear prediction) frame by speech encoder of codec 11. The speech coding algorithm is a member of a class of speech coders known as Code Excited Linear Predictive coding (CELP), Stochastic coding or Vector Excited Speech (VES) coding. These techniques use code books to vector quantize the signal. VSELP uses a codebook which has a predefined structure, such that the computation required for the codebook search processes can be significantly reduced. The frame length is 159 bits (20 ms), comprising filter coefficients (38 bits), frame energy (5 bits), lag (28 bits), code-words (56 bits) and gains (32 bits). It is also to be understood that the invention is not restricted to this type of frame.

Before transmission to base station 2, the VSELP signal is channel encoded in channel encoder of codec 11. Channel encoding is used in digital cellular technology to overcome RF channel impairments and the corresponding bit corruptions. CRC bits are added to each frame, the CRC bits being provided over the most sensitive bits to indicate at the reception when frames should be considered lost. Forward error correction (FEC) bits are also added. Separate control channels are actually used for control messages between the radiotelephone 1 and base station 2.

The frames are finally modulated (DQPSK) and transmitted over the air interface from terminal 1 to a transceiver at the base station 2.

The role of the base station 2 is to provide a terrestrial 'anchor' point for the RF channel, and to trigger handover decisions for H/W and S/W hand-offs. The radio signal is recovered, demodulated, multiplexed into, for example, a T1 format and transmitted to a mobile switching center (MTX) 4 over trunk lines 3, which can transport multiple DS-1 carriers. Some frame reconstruction can also take place at the base station. On the down link (reverse direction), base station 2 transmits to radiotelephone 1 the data stream encoded in the same way as for the forward direction.

At MTX 4 the signal is demultiplexed from the trunk line 3, channel decoded to a VSELP format in channel codec 14, speech decoded back to PCM words in speech codec 18, and routed to a switch 6 over trunk lines 5. Echo canceller 20 is provided on the network side of the connection to eliminate the effects of the delays introduced by the speech coding and the transmission processes.

If the call set-up protocol indicates that the radiotelephone 1 requests connection to a land or mobile terminal served by network 9, switch 6 connects the speech signal to network 9 over trunk lines 7 in the known manner. If the call set-up protocol indicates that radiotelephone 1 requests a voice service, switch 6 routes the speech signal in PCM format to VSN 10 over trunk lines 8.

A VSN, such as VSN 10 generally comprises a telephone control section connected to the switch over T1 line 8, a service control section, a voice prompting system, a speech recognizer and a database. The telephone control section interfaces with the T1 carrier performing the actual sending and receiving of voice data to/from the caller and managing the telecommunication protocols. A VSN is able to support a multiplicity of terminals, typically several hundred. The database maintains customer records, voice data files, and other data related to the services offered by the respective provider.

Figure 2A:
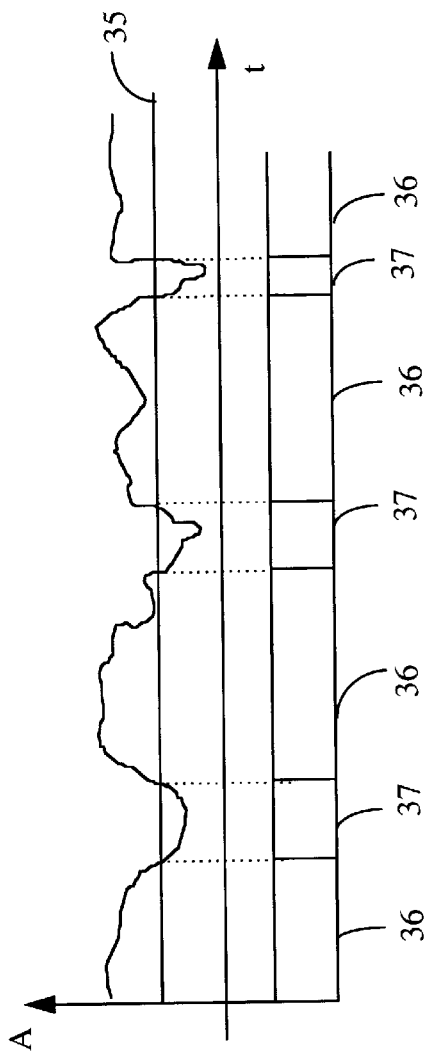
FIG. 2A is an amplitude-time graph showing the result of multipath fading.

FIG. 2A illustrates a RF signal envelope affected by multipath fading. Reference numeral 35 illustrates the reception threshold. The values above this threshold are correctly interpreted by the speech decoder, while the values under the threshold comprise information loss. As such, the information referred by numeral 36 comprises 'good' frames, while information referred to by 37 comprises 'bad' frames.

Figure 2B:
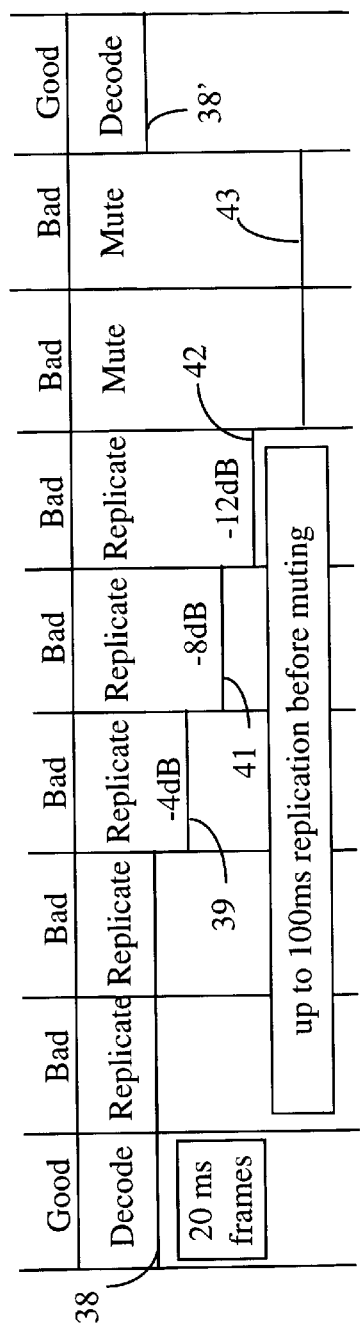
FIG. 2B shows the 'replication and muting' sequence of the speech decoder in conventional TDMA systems.

FIG. 2B shows the 'replication and muting' sequence of the speech decoder. When a 'bad' frame is detected, the speech decoder uses the previous 'good' frames to regenerate speech. For a succession of more than 5 'bad' frames, the first two 'bad' frames are replaced with a replica of the last 'good' frame, as shown by reference numeral 38; the third 'bad' frame is replaced with a replica attenuated by 4 dB, as shown by reference numeral 39; the fourth 'bad' frame is replaced with a replica attenuated by 8 dB, as shown by reference numeral 41; the fifth 'bad' frame, with a replica attenuated by 12 dB, as shown by reference numeral 42, and thereafter the signal is muted, shown by reference numeral 43. Normal decoding is resumed upon reception of a first 'good' frame, as shown by 38'.

It is evident how important is for the speech decoder to be aware of where 'lost' or 'bad' frames are located to avoid generation of loud noises as a result of receiving important bits in error. It is also important for the speech recognizer to be aware of the boundaries (beginning and end of each frame) for correcting the frame drift. The current systems do not provide for these features.

U.S. Pat. No. 5,786,308 (Pon et al. issued on Jan. 16, 1998 and assigned to Northern Telecom Limited) discloses a communication protocol used to improve the communication between two radiotelephones served by the same MTX or by two different MTX's. In the configuration disclosed and claimed in patent application '949, the quality of the calls is enhanced by routing the signal through two channel decoder/encoder pairs to go from one subscriber to another. This mode of operation of the system is defined herein as 'mobile-to-mobile bypass' (MMB), VSELP bypass, or codec bypass mode.

Figure 3:
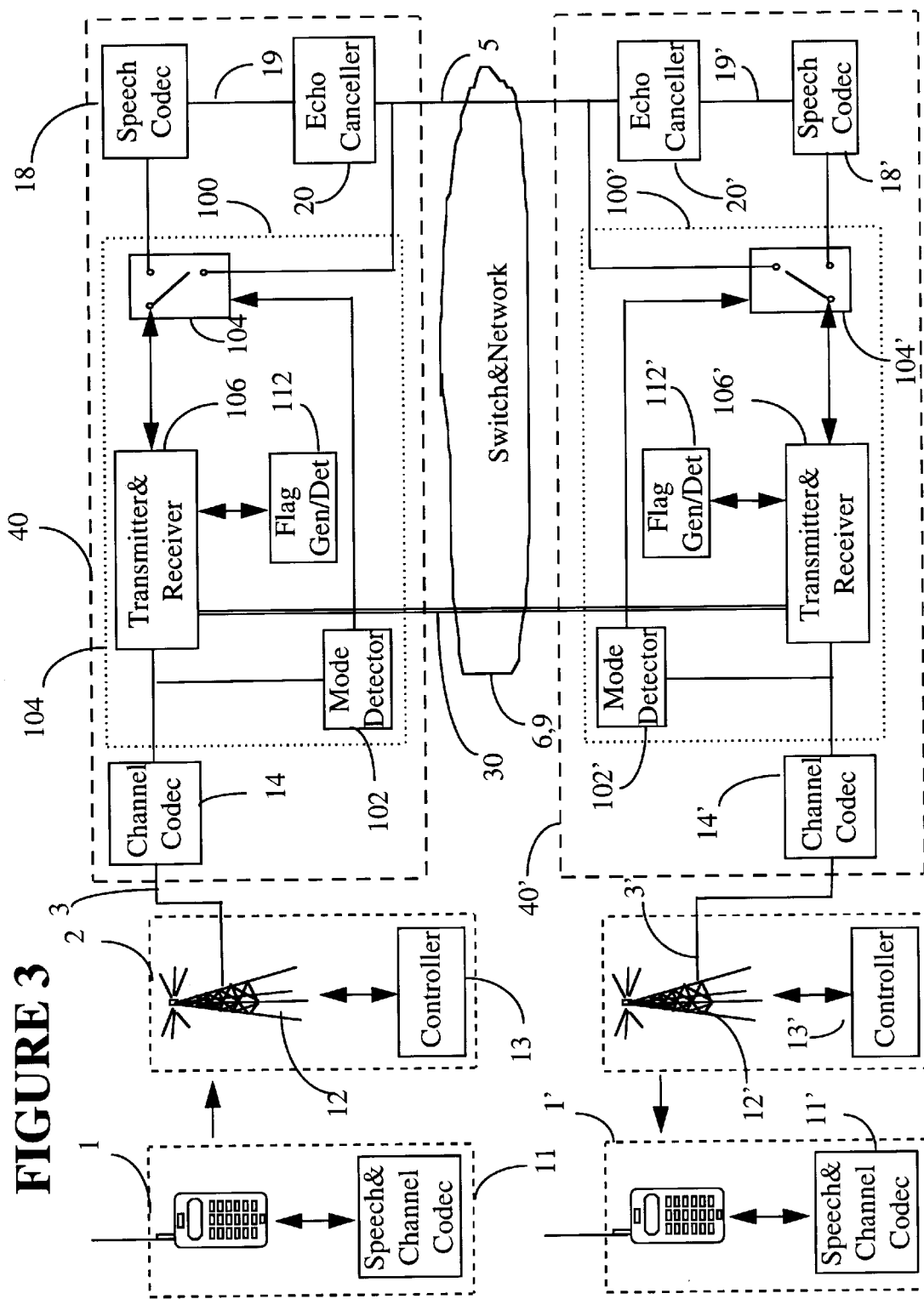
FIG. 3 shows a block diagram of the signal flow in a mobile-to-mobile bypass radio call.

FIG. 3 shows a block diagram of the signal flow in a mobile-to-mobile bypass radio call, as disclosed and claimed in the above-identified U.S. Patent Application, which is incorporated herein by reference. A brief description is provided next for a better understanding of the present invention.

Subscribers 1 and 1' communicate over the public switched telephone network via separate MTXs 40 and 40', but the two subscribers could, as well, be connected to the same MTX. Although the echo canceller, the speech decoder and channel decoder are located at the MTX site in the system illustrated in FIG. 3, it is possible to have some cellular infrastructure deployed at the cell site 2. Nonetheless, the distribution of these units between the cell site and the MTX is not relevant to the invention.

The mobile-to-mobile connection shown in FIG. 3 is realized using two by-pass units 100, 100' (for example, two digital signal processors) provided at the each MTX. Each unit 100, 100' comprises a respective mode detector 102, 102' which determines if the communication link involves two mobiles working in digital mode for initiating the MMB. Switches 104 and 104' figuratively show how the speech signal is routed from the output of the channel decoder of codec 14 in MTX 40 to the input of channel encoder of codec 14' in MTX 40', without undergoing a speech decoding in codec 18 and a speech encoding in codec 18'.

A transmitter/receiver unit 106, 106' is provided at each bypass unit 100, 100' and a bidirectional communication channel is established between them, as shown by connection 30. The double line 30 is not a physical path, but represents a virtual or logical connection between the bypass units 100 and 100' for exchange of messages.

An important feature of the MMB protocol is that a flag is attached by flag generator/detector unit 112, 112' to each frame to inform the speech decoder 11' of where the 'bad' frames are located. The flag detector of flag generator/detector unit 112' provides this information to the speech decoder of radiotelephone 1', and also provides the speech decoder with information regarding the boundaries of the frames and of the utterances.

PCM mode of operation is defined herein as the operation of the system whereby the speech signal arriving at MTX 40 undergoes decoding to PCM words in speech codec 18, after channel decoding, and the PCM formatted signal received at MTX 40' over the network (or from the switch in the case of a single MTX) is encoded from the PCM format to VSELP frames in speech codec 18', as in the case of a mobile-to-land or analog-to-digital communication link.

MMB comprises two parts: a communication protocol and a speech bypass mechanism. The communication protocol lets the two ends of the communication path to determine whether they should communicate in PCM mode, when one terminal is analog and the other digital, or forgo the conversion from compressed speech to PCM to let the encoder in one terminal talk directly to the decoder of the other terminal in a digital-to-digital connection.

In short, for the forward direction from radiotelephone 1 to 1', the transmitter of transmitter receiver unit 106 is initially in a default state (T1) where it transmits its identification 'ID$_1$' over an output PCM word sequence over data channel 30. This is so even in the absence of a remote by-pass unit such as unit 100'. When unit 100 receives an incoming identification 'ID$_2$' from the transmitter of transmitter/receiver 106' of bypass unit 100', the transmitter enters a second state T2, where it sends to unit 100' an 'ID$_2$ acknowledged' message, again transmitted over an output PCM word sequence. Transmitter 106 begins sending the user signal in VSELP frames to receiver 106' on receipt of an 'ID$_1$ acknowledged' message to its own identity from unit 100' in a third state. This hands-shaking sequence is provided to ensure that a two-way communication link is fully established between the two bypass units, and also to ensure smooth transition from PCM mode of operation to MMB mode, before establishing connection in MMB mode.

Upon successful handshakes between units 100 and 100', each bypass unit activates the bypass mechanism to transmit the mobile audio signal in VSELP format from channel codec 14 to channel codec 14'. Transmitter 106 enters this fourth state only when the input to unit 100 is also VSELP frames.

Receiver 106' operates in two states. A first, default state is entered every 20 ms in the absence of a VSELP frame at the input. Under normal mobile-to-land communication, the receiver always operates in the first state. It enters in a second state for 20 ms immediately after it receives a VSELP message.

The block diagram is symmetrical, transmitter and receiver of the respective transmitter/receiver units 106' and 106 operate similarly for the reverse direction.

The communication protocol is active at all times to establish connection between the two bypass units, and is transparent to the system users in both mobile-to-mobile and mobile-to-land connections. As such, a protocol message is always written at the output of transmitter of unit 106. The by-pass signal between units 100 and 100' is transmitted at a rate of 64 kbps in both PCM and by-pass modes. The signal (hereinafter also referred by reference numeral 30 of the virtual connection between the bypass units) is composed of two types of information: user information and in-band signalling information. In-band signalling means in this case transmission of control signals over a data channel by stealing some bits of information at regular intervals that are selected to minimize the perceptual impact on the signal at the receiver. The format of signal 30 is changed from user information format to in-band signalling format in different stages of the protocol, as disclosed above.

Figure 4B:
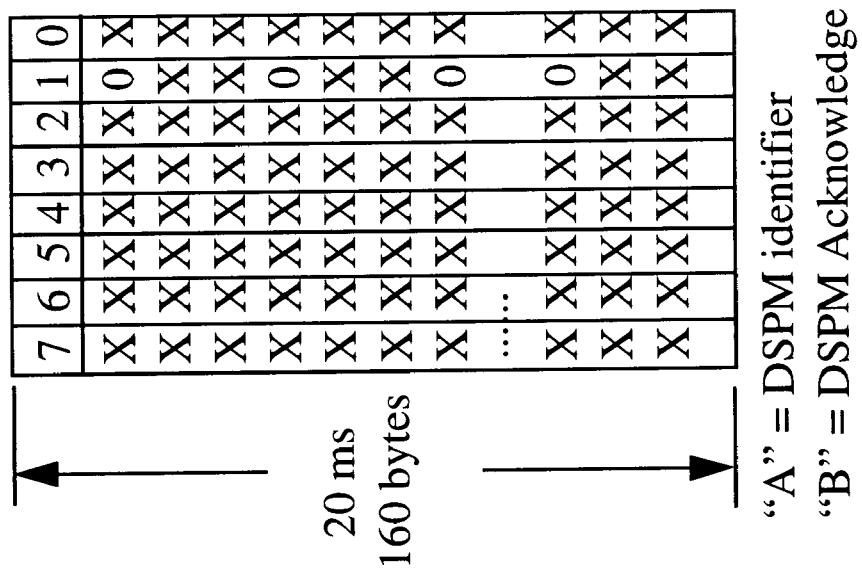
FIG. 4B represents a VSELP frame with messaging and voice information.
Figure 4A:
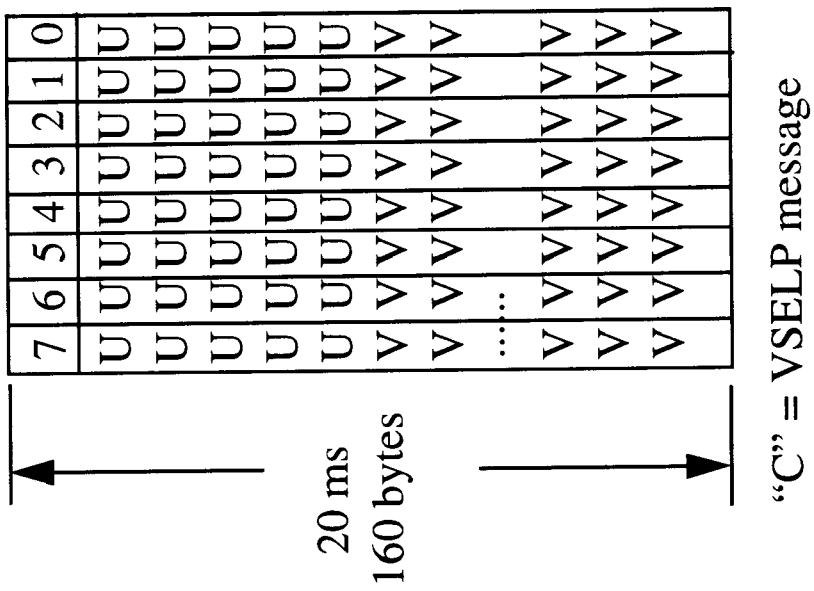
FIG. 4A represents a plurality of 8-bit PCM samples with mobile-to-mobile protocol bit stealing.

FIG. 4A represents a 160-bit frame of 8-bits PCM words with mobile-to-mobile protocol bit stealing according to the patent application '949. Here, X represents a PCM information bit and 0 is a message bit. Bit stealing takes place at regular intervals, which is shown on every third PCM sample in FIG. 4A for illustrative reasons. In fact, bit stealing takes place every 20 samples, or at any other rate according to the design and operational parameters of the system. In-band signalling uses the second less significant bit only, leaving the 6 upper bits for transmission of voice signals.

FIG. 4B illustrates the structure of a VSELP frame containing a VSELP message (U) and VSELP voice information (V).

While the system according to the above patent is useful when a mobile terminal is connected to another through one or two switches, the present invention relates to the communication between a mobile terminal and a speech activated voice service node.

Figure 5:
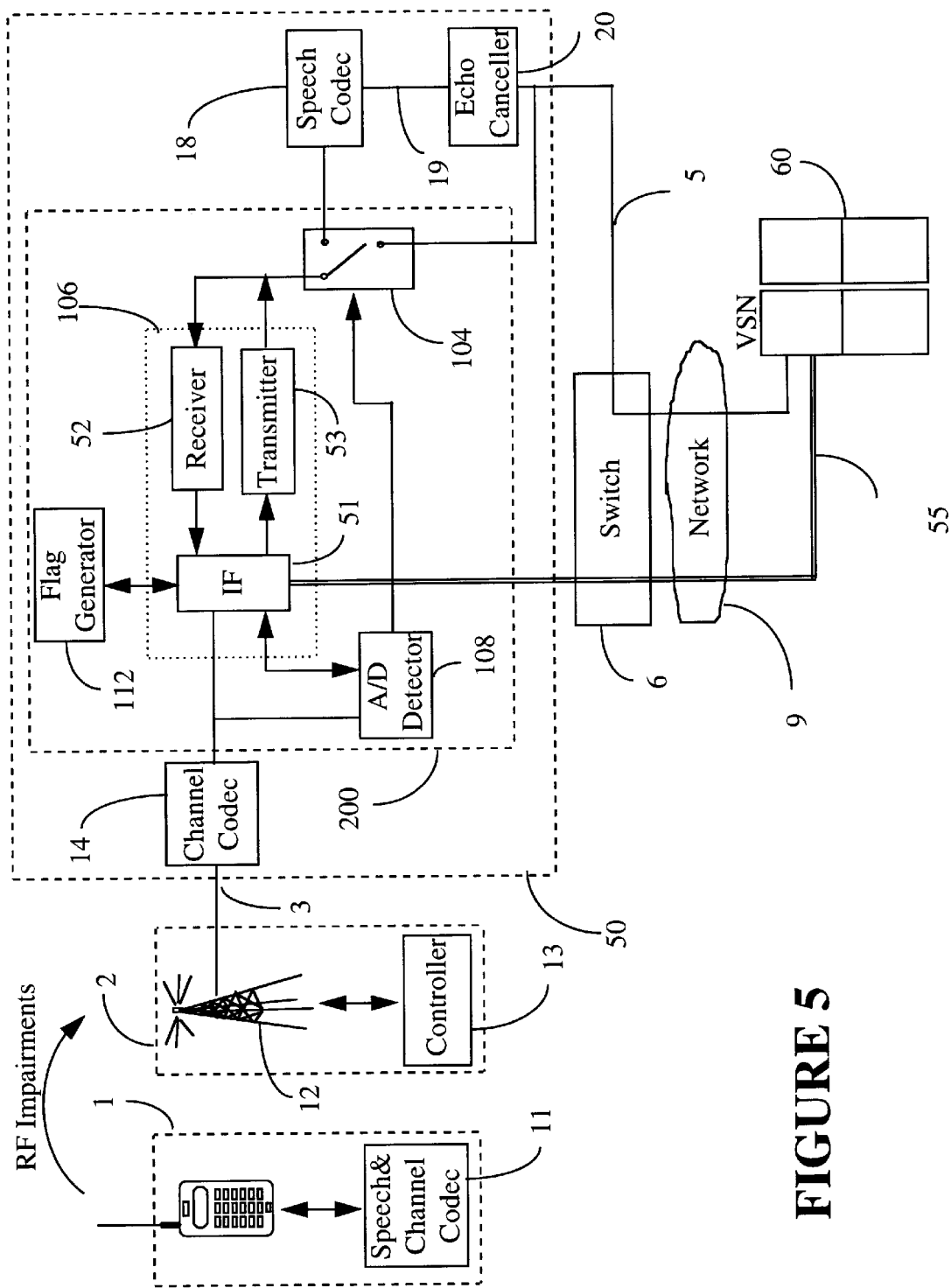
FIG. 5 illustrates the block diagram of the system according to the invention.

FIG. 5 illustrates the block diagram of the system according to the invention, for establishing connection between a speech terminal 1 and a voice service node VSN 60. MTX 50 is provided with a bypass unit 200, and accordingly supports codec bypass. Voice service node 60 also supports codec bypass. At call initiation, the two ends start in PCM operating mode. An analog/digital detector unit 108 determines if the call has originated from an analog or a digital radiotelephone 1. Unit 108 is intended to intuitively show the ability of the by-pass unit 200 to determine the type of radiotelephone and to switch to by-pass operation if radiotelephone 1 is digital.

If the call has originated from an analog radiotelephone 1, the speech frames from the output of channel codec 14 are passed by switch 104 to speech codec 18, as in the prior art, and then connection to VSN 60 is established through switch 6 (and network 9, if the VSN and MTX are provided at different locations) in the known manner. For the reverse direction, when VSN 60 sends information to an analog radiotelephone, the PCM words from VSN 60 arrive at MTX 50 on connection 5, the words are encoded in speech frames by speech codec 18 and then sent to channel codec 14, as well-known.

However, if the originating speech terminal 1 is digital, analog/digital detector unit 108 initiates the codec bypass mode. Now, the VSELP frames are directed by switch 104 to VSN 60 without undergoing speech decoding, as figuratively shown by switch 104. The double line 55 represents a direct digital channel between MTX 200 and VSN 60 for exchange of messages, as in the above identified patent. As indicated above, operation in bypass mode is transparent to the user. Transmitter 53 and receiver 52 of unit 106 operate as described in connection with FIG. 3. Flag generator unit 112 communicates to VSN 60 information about the condition of the frames (replicated, muted or good) and also about the beginning of each frame according to the by-pass protocol.

For the reverse direction, the speech frames received at bypass unit 200 are presented to channel codec 14 by receiver 52. Flag detector unit 112 processes the information about the condition of the voice frames, according to the by-pass protocol. The connection between codec 14 and radiotelephone 1 is effected as in the prior art.

Figure 6:
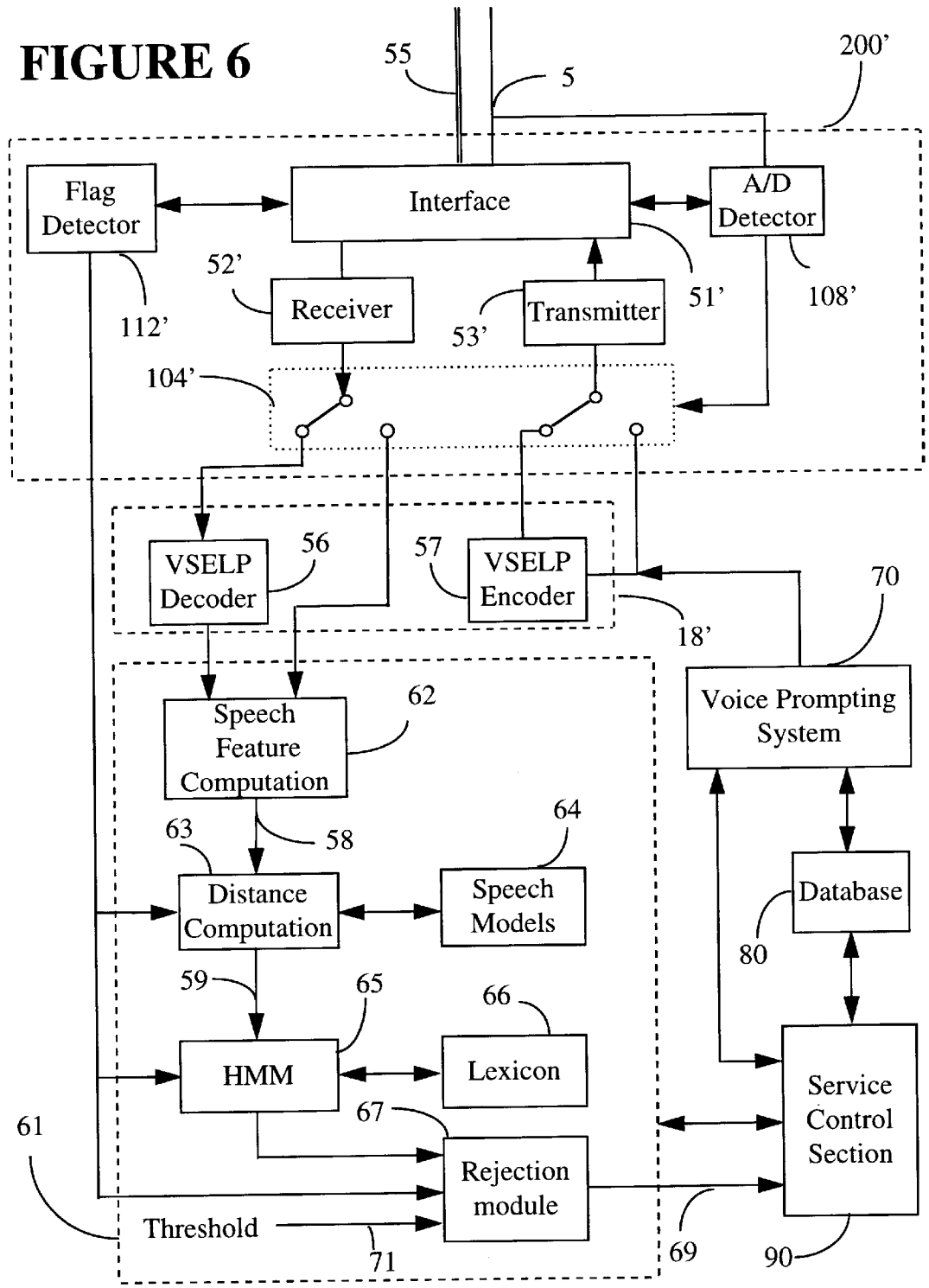
FIG. 6 illustrates the block diagram of the speech recognition system according to the invention.

FIG. 6 shows the block diagram of VSN 60 of FIG. 5. The voice node is provided with a bypass unit 200' connected to bypass unit 200 in MTX 50 over the direct digital channel 55. VSN 60 also comprises a speech codec 18' including VSELP decoder 56 and VSELP encoder 57, which are inserted in the path of the incoming and outgoing signal, respectively, according to the mode of operation in codec bypass or PCM mode. Selection of the mode of operation is figuratively shown using A/D detector 108' and switch 104'.

Speech recognizer 61 is of the type based on flexible vocabulary recognition (FVR) which relies on phone based sub-word models to perform speaker independent recognition over the telephone. Rejection is an integrated part of the technology of recognizer 61, and the system detects when the confidence level or the top choice is too low, and when the user has said something that it cannot understand. In the recognition process, speech 'features' are computed for each incoming frame. These 'features' are usually Cepstrum coefficients, which are a representation of the frequency content of the given frame. This operation is shown in speech feature computation block 62 and Cepstrum coefficients are output at 58.

The 'features' are then compared in block 63 to speech models provided by unit 64 and a distance 59 is computed between the 'features' and a number of speech models. Block 65 uses for this evaluation a process called hidden Markov model (HMM). The sequence of distances is evaluated in block 65 to find out the utterances to which it matches best, using data from lexicon 66.

According to this invention, distance computation block 63 also receives information regarding the status of each frame, for enabling block 63 to compensate for the drift in replicated frames by multiplying the distances of the frames that are replicated or muted with increasingly smaller factors, to reduce the importance of these frames in the HMM search. A frame that is muted is given the distance zero with regard to all speech models.

HMM 65 receives the sequence of distances from distance computation unit 63, the boundary of each frame and the end points of utterances from unit 112'. HMM 65 reports recognition results to rejection module 67, which in turn reports the choices to service control section 90 over connection 69. The top choices on output 69 from rejection module 67 are classified as correct acceptances (CA), false acceptances (FA), and the rejections are classified as correct rejection (CR) and false rejection (FR).

As indicated above, rejection module 67 attempts to detect when the recognition result is incorrect, either because the person said something that is outside the lexicon, (an impostor) or because the recognizer has made an error. An utterance is rejected when the number of consecutive replicated or muted frames exceeds a threshold, illustrated at 71, in which case voice prompting unit 70 will prompt the user to repeat the word. The recognition system also computes a risk factor based on the number of bad frames received during an utterance and the speech recognizer can initiate a rejection.

FIG. 6 also shows voice prompting system 70 and database 80 that allow for the dialogue with the end user. Database 80 maintains customer records, voice data files, and other data related to the services offered by the respective provider. Service control section 90 supervises the correct operation of the speech recognizer, voice prompting system and the database 80.

The mode of operation of the system according to the invention is next described in connection with FIGS. 5 and 6.

For the by-pass mode, forward direction, from radiotelephone 1 to the voice node 60, transmitter 53 and receiver 52' effect the hands-shaking sequence by exchanging identities $ID_1$ and $ID_2$ and acknowledgements to the identities, as described in connection with FIG. 3. Transmitter 53 enters in the third state T3 and begins transmitting the user signal in VSELP frames to receiver 52' on receipt of an '$ID_1$ acknowledged' message to its own identity. Thereafter, transmitter 53 enters in the fourth state, when it receives VSELP frames from channel codec 14 and sends the frames to receiver. Once in codec bypass mode, mode detector 108' of VSN 60 operates switch 104' to send the VSELP frames to speech codec 18', where the frames are decoded by VSELP decoder 56 before they are presented to speech recognizer 61.

For the by-pass mode, reverse direction, once the handshaking protocol establishes the direct digital connection between transmitter 53' and receiver 52, detector 108' positions switch 104' to connect the output of VSELP encoder 57 to input of transmitter 52. The PCM words from voice prompting system 70 are encoded in VSEPL encoder of codec 18' and presented to transmitter 53'. The speech frames arrive at receiver 52 and are thereafter presented to channel codec 14, for transmission to radiotelephone 1 in the known way.

The speech recognizer 61 receives in addition to the voice signal, a bit stream (shown on FIG. 4B as messages V) that identifies where the boundary between frames is located and which frames are 'good' and which are 'bad'.

Based on this information, the recognizer can weigh appropriately its distance metric when trying to match reference words to speech patterns.

As indicated above, MTX 50 can handle analog calls, from radiotelephones that are not digital. In this case, the switch will not attempt to set-up the connection in by-pass mode and VSN 60 will automatically be informed to process input speech in PCM format, as in the prior art.

While the invention has been described with reference to particular example embodiments, further modifications and improvements which will occur to those skilled in the art, may be made within the purview of the appended claims, without departing from the scope of the invention in its broader aspect.

I claim:

1. A voice service node (VSN) serving a wireless speech terminal (WST) connected to a mobile switching center (MSC), for voice recognition and voice prompting comprising:
   a bypass unit for exchanging messages with a MSC bypass unit according to a bypass protocol and switching the operation of said VSN between a PCM mode of operation, when said VSN receives an incoming speech signal in the form of PCM words, and a codec bypass mode of operation, when said WST operates in a digital mode, and said bypass unit receives an incoming speech signal in the form of speech frames from said MSC bypass unit;
   a speech codec operating during said bypass mode for receiving said speech frames and decoding each speech frame into a sequence of digital words; and
   a speech recognizer for receiving said sequence of digital words from said speech codec and recognizing an utterance corresponding to said sequence of digital words under the control of said bypass unit.

2. A VSN as claimed in claim 1, wherein said messages are exchanged through in-band signaling over a plurality of consecutive speech frames and PCM words.

3. A VSN as claimed in claim 1, wherein a message associated to said speech frame comprises a flag defining the status of said speech frame as one of a replicated, muted and decoded speech frame.

4. A VSN as claimed in claim 3, wherein said bypass unit comprises:
   a receiver/transmitter unit for receiving said speech frame from said MSC bypass unit and extracting said flag;
   a switch operating in said bypass mode to direct said speech frame from said receiver/transmitter unit to said speech codec, and operating in said PCM mode to direct digital words received from said MSC to said speech recognizer;
   a mode detector for recognizing when said WST operates in a digital mode and accordingly operating said switch to direct said speech frame to said speech codec.

5. A VSN as claimed in claim 4, wherein said bypass unit further comprises a flag detector for recognizing and extracting said flag from said associated message and providing same to said speech recognizer.

6. A VSN as claimed in claim 3, wherein said speech recognizer comprises:
   a speech feature computation unit for receiving said sequence of digital words and providing a set of parameters characterizing said sequence of digital words;
   a distance computation unit for receiving said set of parameters and said flag for determining a set of distances between a speech model and said set of parameters;
   a searching unit for receiving said set of distances, and a measure of the boundary of said speech frame extracted from said messages, and locating a plurality of choices in a lexicon; and
   a rejection unit for determining a top choice and rejecting all choices if none of said choices is above a recognition threshold.

7. A VSN as claimed in claim 6, wherein said distance computation unit comprises means for multiplying the distances of said set of distances with a sub-unity factor, whenever said flag indicates that said speech frame has been replicated.

8. A VSN as claimed in claim 7, wherein said factor is increasingly reduced for each subsequent speech frame that has been replicated, and is zero when said speech frame has been muted.

9. A voice service node (VSN) serving a wireless speech terminal (WST) connected to a mobile switching center (MSC) for voice recognition and voice prompting comprising:
   a bypass unit for exchanging messages with a MSC bypass unit according to a bypass protocol and switching the operation of said VSN between a PCM mode of operation, when said VSN transmits an outgoing voice prompt signal in the form of PCM words, and a codec bypass mode of operation when said MSC operates in a digital mode, and said bypass unit transmits an outgoing voice prompt signal in the form of a speech frame to said MSC bypass unit;
   a speech codec operating during said bypass mode for receiving a sequence of digital words and encoding same into said speech frame; and
   a speech prompting system for generating said voice prompt in the form of said sequence of digital words and providing same to said speech codec when said VSN operates in said codec bypass mode of operation, and providing same to said WST when said VSN generates in said PCM mode.

10. A VSN as claimed in claim 9, wherein said bypass unit comprises:
   a receiver/transmitter unit for transmitting said speech frame to said MSC bypass unit;
   a switch operating in said bypass mode to direct said speech frame from said speech codec to said receiver/ transmitter unit, and operating in said PCM mode to direct said sequence of digital words from said speech prompting system to said MSC; and a mode detector for recognizing when said WST generates in a digital mode and operating said switch to collect said speech frame from said speech.

11. A method for establishing a digital connection between a wireless speech terminal (WST) and a voice service node comprising (VSN):

performing a bypass protocol to establish a direct connection between a remote bypass unit in a mobile switching center (MSC) and a local bypass unit of said VSN whenever said WST operates in a digital mode;

switching said local bypass unit and said remote bypass unit to operate in a bypass mode if said protocol is successful;

bidirectionally transmitting speech frames between said local bypass unit and said remote bypass unit;

speech decoding an incoming speech frame at said VSN and transmitting same to a voice recognizer; and determining at said speech recognizer an utterance corresponding to said speech frame.

12. A method as claimed in claim 11, further comprising, at said VSN, the step of speech encoding a prompt signal generated by a speech prompting system into an outgoing speech frame, and transmitting same to said local bypass unit for transmission to said remote bypass unit.

13. A method as claimed in claim 11, wherein said step of performing a bypass protocol includes exchanging messages between said local and said remote bypass units through in-band signaling over a plurality of consecutive speech frames and PCM words.

14. A method as claimed in claim 11, further comprising the steps of:

declaring a recognition failed whenever said speech recognizer cannot find a correspondence between said utterance and any of the entries in the lexicon; and prompting said remote bypass unit to initiate repetition of said utterance whenever said recognition failed is declared.

15. A method as claimed in claim 11, wherein said step of determining a lexicon entry corresponding to said utterance comprises the substeps of:

providing said sequence of digital words to a speech feature computation unit and determining a set of parameters for said sequence of digital words;

providing said set of parameters and a flag to a distance computation unit for determining a set of distances between a speech model and said set of parameters;

providing said set of distances and a measure of the boundaries of each speech frame to a searching unit and detecting a plurality of choices in a lexicon; and determining a top choice and rejecting all choices if none of said choices is above a recognition threshold.

16. A method as claimed in claim 15, wherein said steps of providing said flag to said distance computation unit comprises:

extracting said flag from a message associated to said frame, said flag indicating if said speech frame is one of a replicated, muted and decoded frame;

multiplying the distances of said set of distances with a sub-unity factor, whenever said flag indicates that said speech frame has been replicated.

17. A method as claimed in claim 16, wherein said step of multiplying comprises:

increasingly reducing said factor for each subsequent speech frame that has been replicated; and reducing said factor to zero when said speech frame has been muted.

* * * * *